United States Patent [19]
Cote

[11] Patent Number: 5,567,312
[45] Date of Patent: Oct. 22, 1996

[54] PRESSURE AND RECIRCULATING PUMP FOR CONCENTRATING A SOLUTION

[75] Inventor: Denis Cote, Ham-Nord, Canada

[73] Assignee: Les Enterprises Denis Darveau, Ham-Nord, Canada

[21] Appl. No.: 256,527

[22] PCT Filed: Jan. 15, 1993

[86] PCT No.: PCT/CA93/00011

§ 371 Date: Nov. 15, 1994

§ 102(e) Date: Nov. 15, 1994

[87] PCT Pub. No.: WO93/14319

PCT Pub. Date: Jul. 22, 1993

[30] Foreign Application Priority Data

Jan. 15, 1992 [CA] Canada .................................. 2059392

[51] Int. Cl.⁶ ........................................................ B01D 6/12
[52] U.S. Cl. .................................... 210/321.66; 210/416.1
[58] Field of Search ........................... 210/321.66, 416.1, 210/652

[56] References Cited

U.S. PATENT DOCUMENTS

| | | |
|---|---|---|
| 3,369,667 | 2/1968 | Clark et al. ................. 210/34.66 X |
| 3,472,765 | 10/1969 | Budd et al. . |
| 3,505,215 | 4/1970 | Bray . |
| 4,705,625 | 11/1987 | Hart, Jr. . |
| 4,773,991 | 9/1988 | Aid . |
| 4,842,725 | 6/1989 | Blad et al. ........................... 210/137 |
| 4,961,851 | 10/1990 | Barbachano et al. . |
| 4,973,408 | 11/1990 | Keefer ................................... 210/652 |
| 4,983,305 | 1/1991 | Oklejas et al. ........................ 210/642 |

FOREIGN PATENT DOCUMENTS

| | | |
|---|---|---|
| 727653 | 6/1932 | France . |
| 2072337 | 9/1971 | France . |
| 2616425 | 12/1988 | France . |

*Primary Examiner*—Frank Spear
*Attorney, Agent, or Firm*—Klauber & Jackson

[57] ABSTRACT

A pump comprises two discrete series of pumping stages, the first having a lower liquid output than the second. The liquid is recirculated from a processing enclosure in particular using reverse osmosis, nanofiltration or the like, to the second series of processing stages where it is mixed with liquid from the first series of stages, whereafter the resulting mixture is conveyed to the processing enclosure. With this high-output system, no second pump is required.

7 Claims, 4 Drawing Sheets

PRESSURE AND RECIRCULATING PUMP FOR CONCENTRATING A SOLUTION

TECHNICAL FIELD

The invention pertains to a pressure and liquid recirculating pump. More particularly, the present invention concerns an installation used for the concentration of a solution, notably maple water, impure water, and others, by way of a process using a semi-permeable membrane. According to the present invention, the pressure pump is used for both the introduction of the liquid under pressure in the compartment which houses the membrane, and the recirculation of this liquid so as to remedy the clogging of the membrane, and so as to diminish the concentration at the surface of the membrane, which results in a lowering of the osmotic pressure and produces an increase in the permeation flow.

BACKGROUND ART

It is known that, in reverse osmosis, the solutions of salts or other solutes, notably those of low molecular weight, for instance sea water, maple water and others, are put into contact with a selective membrane and are subjected to a pressure. Contrary to what happens in the case of a conventional osmosis where there is an equilibrium of the solution on each side of the membrane, the reverse osmosis works in a way such that the solution having a low concentration and even a very very low concentration emerges on the side of the membrane opposite the original solution. In all, in order to reverse the normal osmotic flow from the side of the membrane where the solution is less concentrated towards the side where the solution is more concentrated, there is exerted on the solution to be treated a pressure differential which is higher than the osmotic pressure differential of the solutions in contact with the surfaces of the membrane. Now, it has been discovered that, during a reverse osmosis operation, the concentration at the interface membrane-solution to be treated was higher than the mean concentration on the high pressure side of the membrane. This abnormally high concentration at the interface becomes an obstacle to the quality of the product obtained because on one hand an important fraction of the salt or other particles in the solution, in contact with the membrane, is rejected and on the other hand, by recirculating, there is a reduction in the concentration at the surface of the membrane of the components of low solubility which can be tolerated without precipitating on the membrane.

Commonly, clogging is used to define all phenomena, other than temperature variation and compaction, which cause a lowering of a membrane's permeability to pure water. These phenomena are linked to the presence of solutes or other particles in suspension, notably colloids, bacteria, etc., which can settle at the surface or in the pores of the membrane. The clogging can be more or less rapid depending on the nature of the particles which are present and on their concentration at the surface of the membrane. To obviate the problems resulting from the clogging of the membrane, which is more or less reversible, we resort to a rinsing with cold pure water or with hot water, or to a cleaning.

In the production of maple syrup, maple water has always been evaporated until the syrup is obtained. Now, with the staggering increase in the price of energy, it has shown to be useful to effect such an evaporation from a solution which is more concentrated than the water obtained directly from the maple tree. To do so, we have resorted to reverse osmosis which rejects water which is almost pure and produces at the end a water which is more concentrated. As in other reverse osmosis cases, there is an important clogging problem of the membrane. Indeed, the maple water solutes are essentially sugars and minerals. Maple water contains also bacteria having a number which can vary from a few tens to many millions per ml. The solutes are almost totally retained by the membranes of the reverse osmosis or nanofiltration types, notably very close to a 100% for the sugars and more than 95% for the minerals. A fortiori, the particles in suspension, including the bacteria, are also retained. The sugar molecules, which are bigger, diffuse less rapidly than the ions, the most present type of minerals in solution. All of this favors, relatively, a greater accumulation of sucrose than of minerals at the surface of the membrane thereby resulting in an important clogging of the latter.

Nowadays, we have noticed that the best way to overcome at least partly the problem of the clogging of the membrane, was to have recourse to a recirculation of the liquid under reverse osmosis treatment. To do so, the liquid can be recirculated in the same pump or the recirculation can be achieved by way of an additional pump. In the system without recirculation, we have obtained a recovery of 19% (permeate flow:feed flow), and consequently, a large waste of water. If, on the other hand, we recirculate in the same pump, we obtain a mean recovery of approximately 24% but there is also a waste of water and energy. If we wish to have a good yield, we must then have recourse to three similar systems, one after the other, which is extremely costly. To obtain a good yield of approximately 75%, in a single operation, two pumps can be used with one of the pumps being used only for the recirculation. This alternative is however very costly in view of the presence of the two pumps.

It would be thus of interest to be able to use a system having a single pump, but which would have a recovery substantially improved with respect to what is presently known, and even comparable to the use of two pumps.

As to the technological prior art, the following documents must be mentioned even though they have nothing to do with the present invention:
U.S. Pat. No. 3,472,765
U.S. Pat. No. 3,505,215
U.S. Pat. No. 4,705,625
U.S. Pat. No. 4,773,991

DISCLOSURE OF INVENTION

The object of the invention is to propose an installation for the concentration of a liquid by reverse osmosis or nanofiltration where the recirculation to unclog the membrane is achieved in the pump under pressure in the housing enclosing the membrane.

Another object of the invention concerns the establishment of a process allowing for the unclogging of the membrane in a reverse osmosis or nanofiltration system.

Another object of the invention consists in reducing manifestly the costs of a reverse osmosis or nanofiltration installation involving a recirculation at the level of the membrane of the liquid to concentrate.

Another object of the invention lies in a pump having two distinct series of pumping stages which can be used with every system of treatment of liquid under pressure requiring a recirculation.

The invention pertains to an installation for the concentration of a solution containing one or more solutes and eventually particles in suspension, by reverse osmosis or other process using a semi-permeable membrane, the installation comprising a housing enclosing a semi-permeable membrane responsible for the concentration of the solution, and a pump permitting the introduction of the solution under pressure in the housing, as well as means for ensuring the recirculation of part of the solution so as to ensure at least a partial unclogging of the membrane and reduce the concentration at the surface of the membrane, which produces a lowering of the osmotic pressure and brings about an increase of the permeation flow, characterized in that the pump comprises two means, notably two series of pumping stages, the first means delivering a first volume of solution to be treated corresponding generally to the capacity of permeation of the membrane in the installation and to an evacuation, the first means communicating with the second pumping means for delivering the first volume of solution to concentrate in the second pumping means, the second pumping means being adapted for delivering a second volume of liquid to concentrate greater than the first volume, a secondary liquid inlet provided on the pump in direction of the second pumping means, a first conduit connecting an outlet of the second pumping means to the housing enclosing the membrane and a second conduit connecting the housing enclosing the membrane and the secondary inlet, allowing the pump to ensure both the supply of the membrane and a recirculation of the liquid to concentrate which contributes to the unclogging of the membrane and to the reduction of the concentration at the surface of the membrane which results in a lowering of the osmotic pressure and brings about an increase of the permeation flow.

In a preferred construction of the invention, the first series of pumping stages is adapted to increase to a high pressure the liquid to concentrate and is constituted by a propeller or a series of first propellers disposed one after the other and adapted to ensure the flow of a given volume of liquid to concentrate to the second series of pumping stages, the second series of pumping stages being adapted to convey a high volume of liquid to concentrate already at a high pressure to the first conduit and is constituted by another series of second propellers disposed one after the other and beyond the first propellers and separated therefrom by means, notably guides allowing the simultaneous conveying towards the second series of pumping stages of the liquid to concentrate coming from the first series of pumping stages and the liquid recirculated from the housing where the membrane is located.

In another preferred construction of the invention, each propeller is constituted of a combination of an impeller and a diffuser, and a separator which is disposed between each impeller-diffuser set for separating the sets one from the other, the capacity of the impellers and the diffusers of the first and second series of propellers being such that the volume of liquid delivered by the second series of propellers is greater than the liquid delivered by the first series of propellers.

Preferably, the guides are constituted of alignment bushings. For instance, the alignment bushings comprise a pair of rims each comprising a central hub comprising an opening allowing for the passage of a shaft, and ridges in the shape of webs connecting the hub to the rim, an opening having a semi-circular shape defined on each of the rims, the two rims being positioned side-by-side, the two openings of semi-circular shape facing each other to form a circular opening allowing to convey the recirculated liquid introduced in the pump by the secondary entry towards the second series of pumping stages where the second series of propellers is located.

Preferably, the volume of liquid delivered by the second series of stages is approximately 2 to 8 times, for example, 5 to 8 times greater than the volume of liquid delivered by the first series of stages.

The invention concerns also a process to concentrate a solution containing one or more solutes and eventually particles in suspension, by which the liquid is introduced under pressure in a housing enclosing a semi-permeable membrane responsible for the concentration of the solution by using a pump and by which the liquid is recirculated in the housing at the level of the membrane so as to ensure at least a partial unclogging of the membrane and reduce the concentration at the surface of the membrane, which brings about a lowering of the osmotic pressure and an increase of the flow, characterized in that the pump comprises two means, notably two series of pumping stages, the first means delivering a first volume of solution to be treated corresponding generally to the capacity of permeation of the membrane in the housing and to an evacuation, the first means communicating with the second pumping means for delivering the first volume of solution to concentrate in the second pumping means, the second pumping means being adapted for delivering a second volume of liquid to concentrate greater than the first volume, a secondary liquid inlet being provided on the pump in direction of the second pumping means, the liquid to concentrate being recirculated by conveying it from the housing to the secondary inlet where it is introduced again in the second pumping means for returning to the housing.

The invention concerns also an installation for the recirculation of a liquid from a treatment system of the liquid under pressure, the installation comprising a housing for carrying out the treatment, and a pump allowing for the introduction of the liquid under pressure in the housing, as well as means ensuring the recirculation of part of the liquid, characterized in that the pump comprises two pumping means, the first means delivering a first volume of liquid to be treated corresponding generally to a capacity of the housing, the first pumping means communicating with the second pumping means for delivering the first volume of solution in the second pumping means, the second pumping means being adapted for delivering a second volume of concentrated liquid greater than the first volume, a secondary liquid inlet provided on the pump in direction of the second pumping means, a first conduit connecting an outlet of the second pumping means to the housing and a second conduit connecting the housing and the secondary inlet, allowing the pump to ensure both the supply of the housing and a recirculation of the liquid.

The invention further concerns a process to recirculate a liquid under treatment in a housing where the liquid is maintained under pressure, by which the liquid under pressure is introduced in the housing by way of a pump and by which the liquid is recirculated in the housing, characterized in that the pump comprises two pumping means, the first pumping means delivering a first volume of solution corresponding generally to a capacity of the housing, the first pumping means communicating with the second pumping means for delivering the first volume of solution to the second pumping means, the second pumping means being adapted for delivering a second volume of liquid greater than the first volume, a secondary liquid inlet being provided on the pump in direction of the second pumping means, the liquid being recirculated by conveying it from the housing to the secondary inlet where it is introduced again in the second pumping means for returning to the housing.

BRIEF DESCRIPTION OF THE DRAWINGS

FIG. 1a is a modification of FIG. 1 illustrating another possibility of a primary inlet in the installation;

MODES FOR CARRYING OUT THE INVENTION

Figure 1:
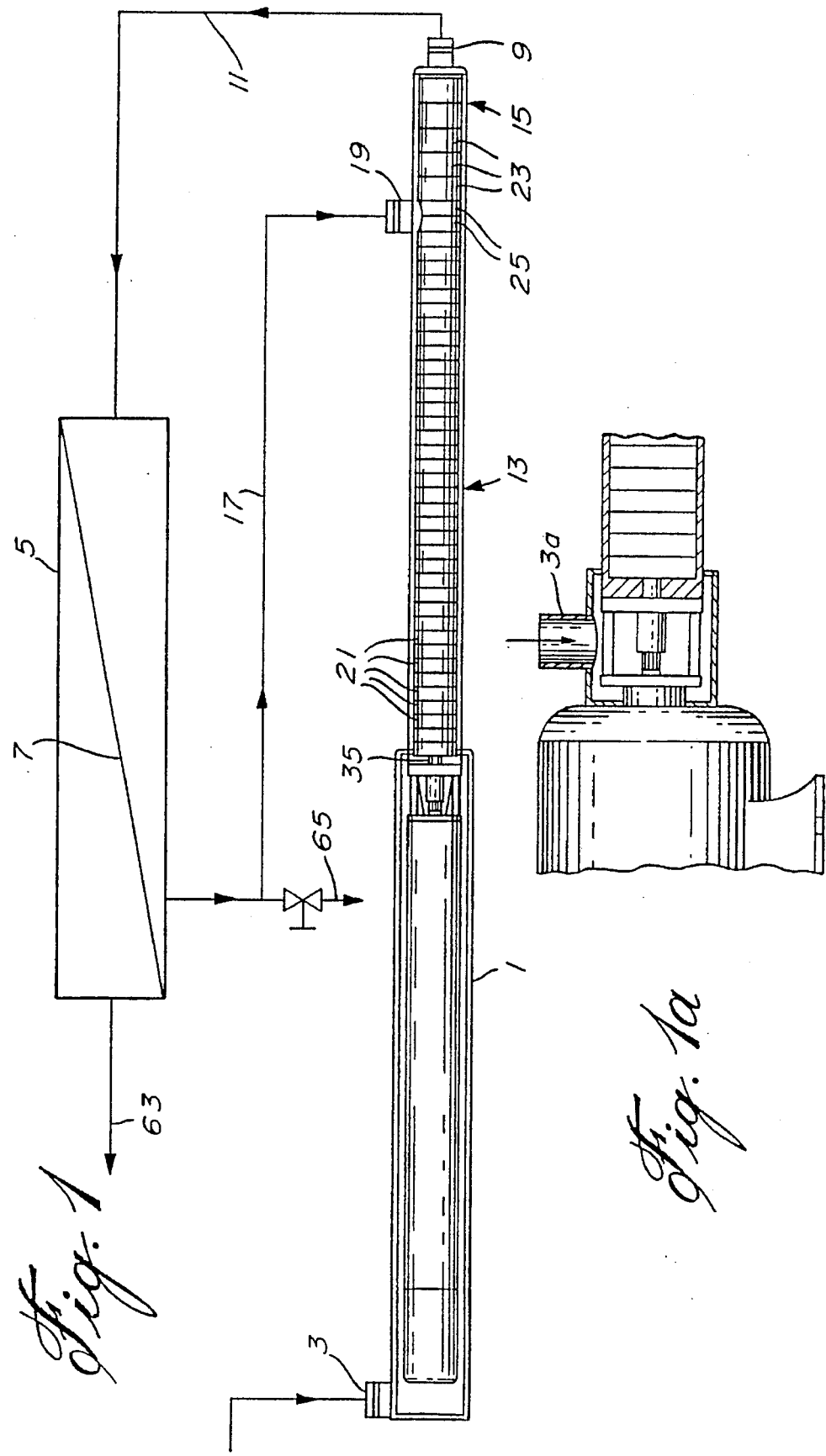
FIG. 1 is a schematic representation of an installation for the concentration of a liquid by reverse osmosis.

With reference to the drawings, more particularly to FIG. 1, it is seen that the illustrated installation comprises a pump 1 connected to a source of liquid (not illustrated) by a primary inlet 3 or 3a in FIG. 1a, and to a housing 5 which comprises a semi-permeable membrane 7 by way of an outlet 9 and a conduit 11. A submersible or exterior motor (not shown) is obviously provided in the body of the pump or on the outside thereof as in FIG. 1a and the latter is constituted essentially of a first series of pumping stages 13 and a second series of pumping stages 15.

On the other hand, the housing 5, including the membrane 7, is connected once again to the pump 1 by a conduit 17 which opens in the junction between the first and second series of pumping stages 13 and 15 by way of a secondary inlet 19.

With respect to the two series of pumping stages 13 and 15, these are schematically illustrated in FIG. 1 and will be described in details hereinbelow. For now, it is sufficient to specify that the constitutive elements of the first series of stages 13 are chosen so as to ensure the flow under pressure of a volume of a solution to concentrate which corresponds generally to the permeation capacity of the membrane 7 in the installation and to an equivalent evacuation of approximately 10 to 25% of the permeation flow. These constitutive elements have been illustrated by reference numeral 21. With respect to the constitutive elements of the second series of stages 15, they will have to deliver a volume of liquid greater than that delivered by the first series of stages 13. The constitutive elements of the second series of stages 15 have been illustrated by the reference numeral 23. Finally, at the level of the secondary inlet 19 in the pump 1 between the first and second series of stages 13 and 15, elements 25 have been provided which constitute a guide permitting the simultaneous flow towards the second series of stages 15 of the liquid to concentrate coming from the first series of pumping stages 13 as well as the recirculated liquid in the second series of stages 15 of the pump 1, via the conduit 17 and the secondary inlet 19, from the housing 5 where the membrane 7 is found. It will finally be seen that the first series of pumping stages 13 delivers the liquid to concentrate from the source, via the elements 25 of the guide in the second series of pumping stages 15, where it will mix with the recirculated liquid to be finally introduced in the housing 5 via the conduit 11.

Now referring more particularly to FIGS. 2, 3 and 4, details of the elements 21, 23 and 25 will now be described.

In all, the elements 21 and 23 are propellers, those located at the level of the series 13 being adapted to ensure the flow of a given volume of liquid to concentrate towards the series 15, said volume being dependent on the capacity of the membrane 7. With regards to the second series of stages 15, we have propellers adapted for a larger volume than those provided in the series of stages 13 as these propellers must convey the simultaneous flow towards the membrane of the liquid to concentrate coming from the first series of stages 13 and the recirculated liquid.

Figure 2:
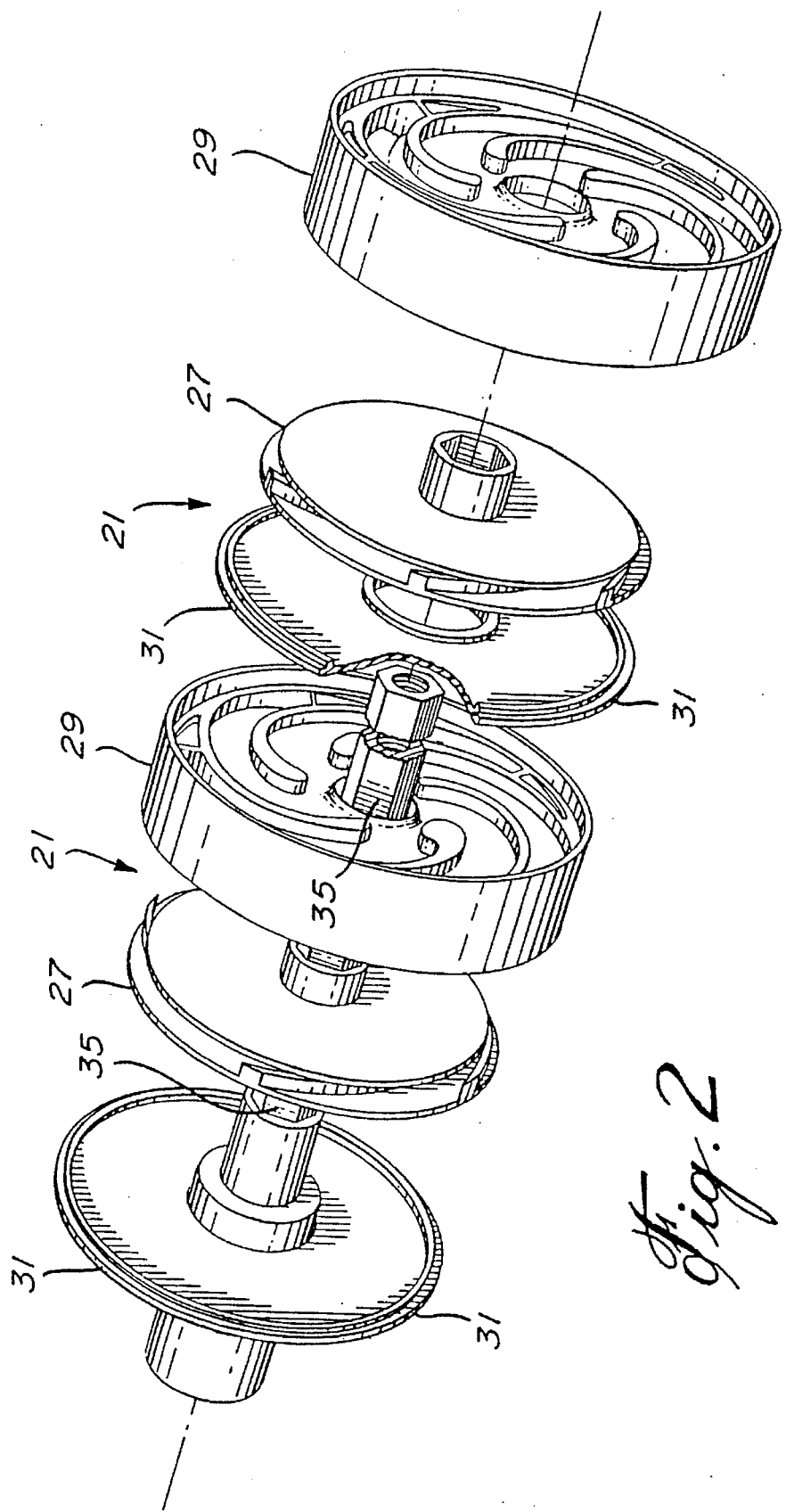
FIG. 2 is an exploded perspective view of part of the first stage of the pump.

With reference to FIG. 2, we will see that the elements 21 each comprise an impeller 27 as well as a diffuser 29 and a disk 31, as it appears in FIG. 2. The disks 31 are disposed between each set of impeller-diffuser 27-29 in such a way as to separate each set from each other. We will note the particular configuration of the constitutive elements 27, 29 and 31. It is obvious that any other arrangement can be chosen as long the series of propellers 21 of the first series of pumping stages 13 produce at a very high pressure the required volume depending on the capacity of permeation of the membrane 7 and to an equivalent evacuation of approximately 10 to 25% of the permeation flow. The pump comprises a shaft 35 which extends beyond the second series of pumping stages 15. In all, as seen in the drawings, the disks 31 as well as the diffusers 29 are fixed with respect to the shaft 35 whereas the impellers 27 are rotatably driven by the shaft 35.

Figure 3:
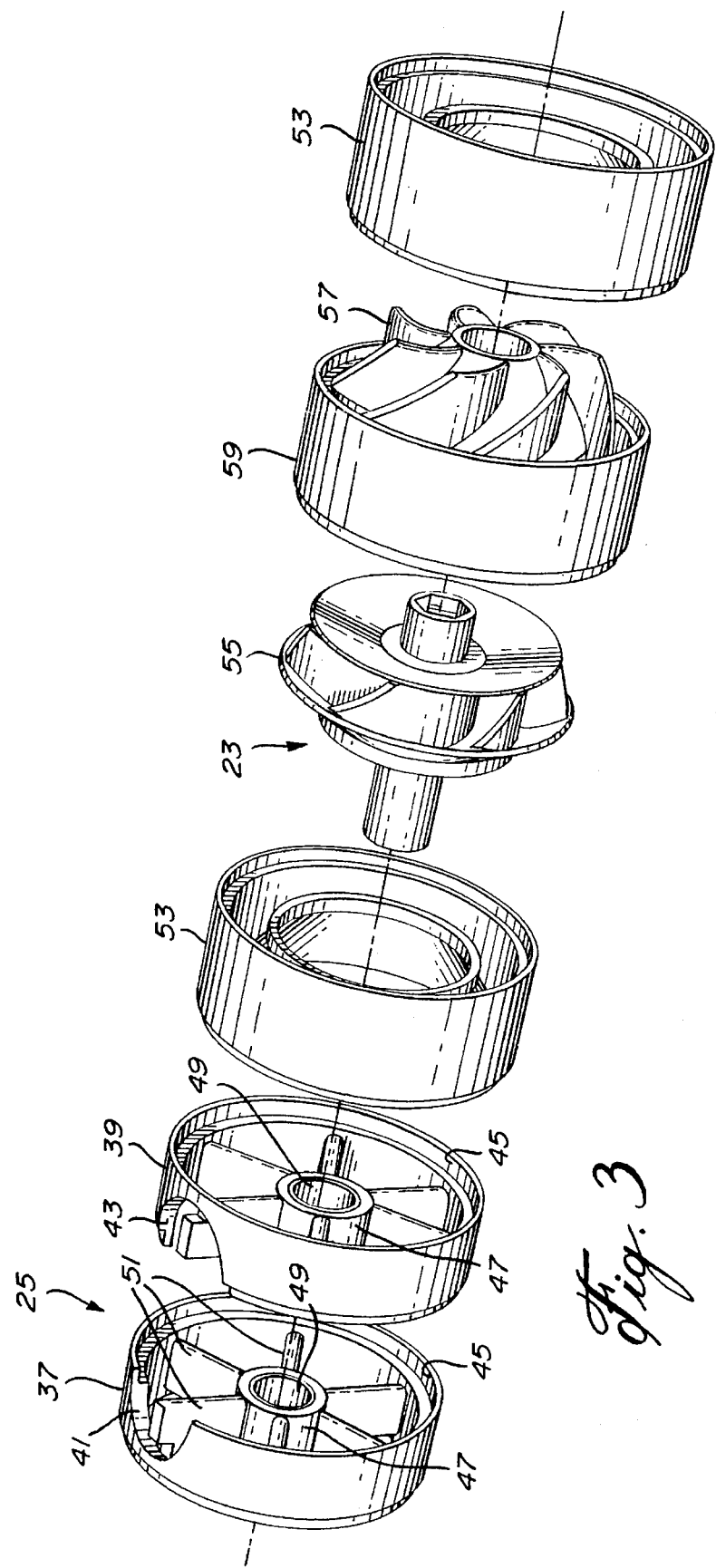
FIG. 3 is another exploded perspective view of a part of the second stage of the pump including the secondary inlet for the recirculation.
Figure 4:
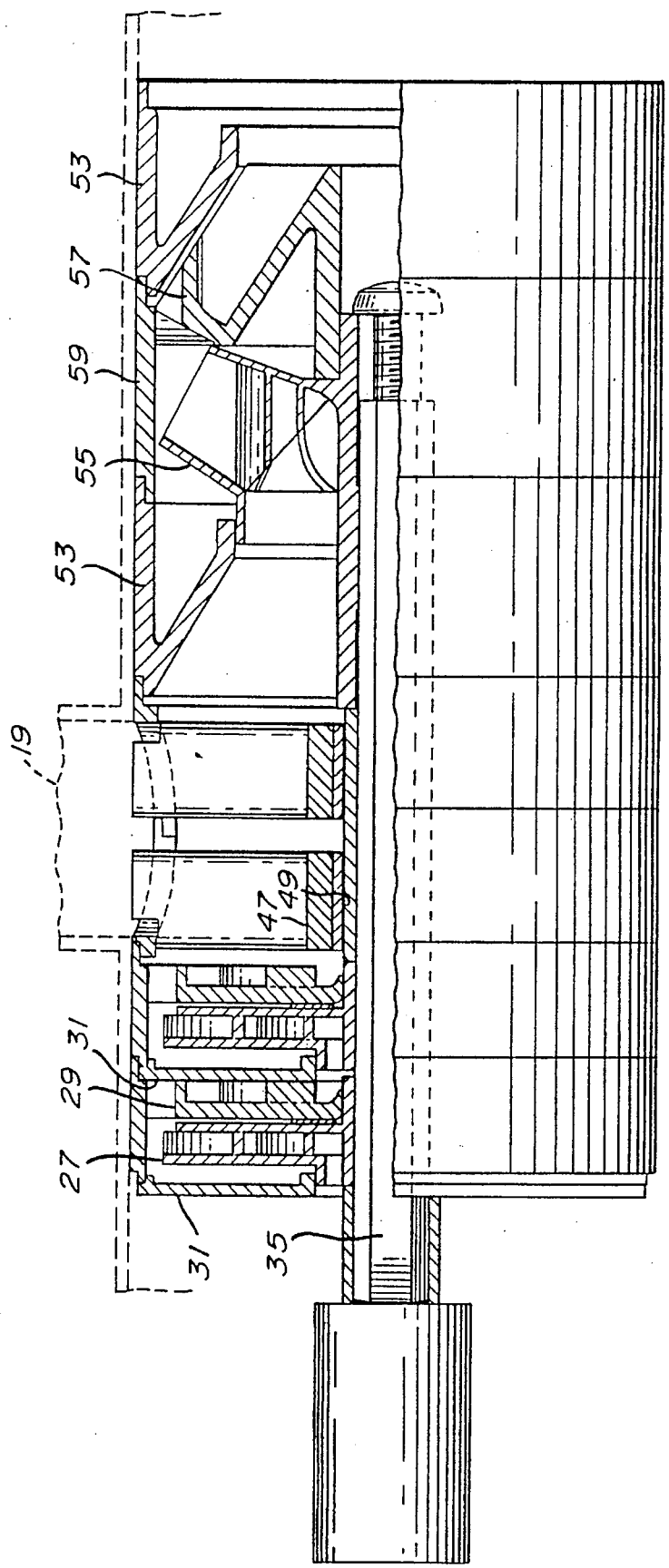
FIG. 4 is a longitudinal cross-sectional view partially taken through the first and second series of pumping stages.

Now referring to FIG. 3 which represents a continuation of FIG. 2, we will first note that the shaft 35 is simply indicated by an axis. Before having access to the second series of pumping stages 23, there is found the guide 25 where are reunited the liquid to concentrate coming from the first series of stages 21 and the liquid recirculated from the membrane 7 via the conduit 17 and the secondary inlet 19. The guide 25 is constituted of two alignment bushings 37, 39. These two bushings are disposed side-by-side as seen in FIG. 4 and are identical except for the mirror disposition of the openings 41, 43 of semi-circular shape which will be further mentioned later. Each alignment bushing is constituted of a rim 45 comprising a central hub 47 defining an opening 49 with the shaft 35 extending therethrough (see FIG. 4), and ridges 51 in the shape of webs connecting the hub 47 to the rim 45. At the top of the two rims 45, openings 41 and 43 are seen in the shape of half-circles, facing each other, as indicated, so as to form an inlet within the two alignment bushings. We will notice that the circular opening constituted by the two openings 41, 43 in the shape of half-circles, permits the conveying of the recirculated liquid introduced in the pump 1 by the secondary inlet 19 towards the second series of pumping stages 15 where we find a new series of propellers 23. The recirculated liquid will find itself a path through the ridges 51 where it will mix with the liquid coming from the first series of pumping stages 13 to form a mixture which will flow towards the second series of pumping stages 15 and from then towards the housing 5 where the membrane is located.

Still referring to FIG. 3, for a detailed illustration of the propellers 23, it is seen that for each propeller 23 there is an annular spacing device 53, an impeller 55, and a diffuser 57 mounted in a hoop 59. Referring more particularly to FIG. 4, these parts are fixed together so as to form a whole in the following manner. The upstream side of the impeller 55 is introduced in the downstream side of the annular spacing device 53, whereas the downstream side of the impeller 55 penetrates the upstream side of the hoop 59 in an adjacent position with respect to the diffuser 57 which occupies the downstream side of the hoop 59 from which it projects along a certain distance as well seen on FIGS. 3 and 4. Finally, the downstream part of the diffuser 57 which extends exteriorly of the hoop 59 engages the inside of the annular spacing device 53 on the upstream side thereof. The shaft 35 extends through each of the components mentioned hereinabove and all of these components are fixed with respect to the shaft 35 except for the impeller 55 which is fixed to the shaft in order to become operational upon rotation of the shaft. Obviously, another arrangement of the components constituting the second series of pumping stages could have been chosen, the only restriction lying in that this series of stages must deliver a volume of liquid greater than the first series of stages 13 while substantially retaining the pressure established by the first series of stages 13. Naturally, the whole constituted by the two series of stages 13 and 15 is enclosed in a circular envelope 61.

In order to operate the installation, one only has to connect the pump 1 to a housing enclosing a semi-permeable membrane 7 by the conduits 11 and 17 and to introduce therein a liquid to concentrate by the primary inlet 3 or 3a. The recirculation will establish itself and after a certain period of time we will collect practically pure water at the outlet 63 and a concentrated liquid at the outlet 65. This installation could be used not only to concentrate maple water, but also any other liquid to concentrate notably sea water, etc. This pump having two series of stages could also be used without being associated to a reverse osmosis operation. Any system using a liquid under pressure and requiring a recirculation of this liquid could obviously use the pump of the invention, thereby dispensing of the use of a second pump. As it was noted hereinabove, the volume delivered by the second series of pumping stages 15 is only required to be greater than that of the first series of stages 13. Practically, the second series of stages is approximately 2 to 8 times, preferably approximately 5 to 8 times greater than the volume delivered by the first stage, but these values are only given for illustration purposes without being limited thereto.

Also for illustration purposes, the liquid supplied to the primary inlet 3 or 3a (according to one of FIGS. 1 or 1a, respectively) can flow with a rate of 10 gallons per minute (GPM) and at a pressure of 30 psi (pounds per square inch). The liquid coming out from the first series of pumping stages 13 has a pressure of 500 psi. The liquid recirculated and reaching by the conduit 17 and the secondary inlet 19 the second series of pumping stages 15 has a pressure of 485 psi and a rate of 60 GPM. The liquid emerging from the second series of stages 15 has thus a rate 70 GPM and a pressure or 500 psi since the second series of pumping stages is adapted to pump a high volume while retaining at least the established pressure of the liquid supplied thereto. Thus, 70 GPM of liquid at 500 psi are supplied by the conduit 11 to the housing 5 which comprises the semi-permeable membrane 7. The permeate emerging from the housing 5 by the outlet 63 can have a flow rate of 7.5 GPM with a substantially non-existent pressure. Consequently 62.5 GPM are directed to the recirculation conduit 17 and to the concentrated liquid outlet 65. For instance, the evacuation through the outlet 65 can be of 2.5 GPM at a substantially non-existent pressure, whereas the liquid recirculated through the conduit 17 can have a rate of 70 GPM with a pressure of 485 psi. Hence, the first series of pumping stages 13 increases the pressure of the source liquid with the second series of stages 15 pumping a considerable volume of liquid while retaining the pressure already established in the source and recirculation liquids supplied thereto. The combination of the two series of pumping stages allows for the pumping under high pressure of a considerable volume of liquid.

I claim:

1. An installation for the concentration, by reverse osmosis, of a solution containing one or more solutes and particles in suspension, comprising:

a housing enclosing a semi-permeable membrane responsible for the concentration of said solution;

a pump for introducing said solution under pressure in said housing and for ensuring recirculation of part of said solution so as to ensure at least a partial unclogging of said membrane and to reduce the concentration at the surface of the membrane to thereby produce a lowering of the osmotic pressure and bring about an increase of the permeation flow; said pump consisting of two successive axially aligned series of pumping stages, each said series of pumping stages having an inlet and an outlet;

i) said inlet of said first series of pumping stages receiving a first volume of solution to be treated corresponding generally to the capacity of permeation of the membrane in said housing and to an evacuation;

ii) said inlet of said second series of pumping stages being in axial fluid contiguity with the outlet of said first series of pumping stages whereby said first volume of solution is delivered to concentrate in said second series of pumping stages;

iii) said second series of pumping stages delivering a second volume of liquid to concentrate greater than said volume;

a first conduit connecting said outlet of said second series of pumping stages to said housing enclosing said membrane;

a secondary liquid inlet connected to said outlet of said first series of pumping stages and said inlet of said second series of pumping stages; and a secondary conduit connecting said housing and said secondary inlet allowing said pump to ensure both the supply of said membrane and a recirculation of the liquid to concentrate to thereby unclog said membrane and reduce the concentration at the surface of said membrane and to thereby lower the osmotic pressure and bring about an increase of the permeation flow.

2. Installation according to claim 1, characterized in that the first series of pumping stages is constructed to increase to a high pressure the liquid to concentrate and is constituted by a propeller or a series of first propellers disposed one after the other and constructed to ensure the flow of a given volume of liquid to concentrate to the second series of pumping stages, the second series of pumping stages being constructed to convey a high volume of liquid to concentrate already at a high pressure to said first conduit and is constituted by another series of second propellers disposed one after the other and beyond the first propellers and separated therefrom by guides allowing the simultaneous conveying towards the second series of pumping stages of the liquid to concentrate coming from the first series of pumping stages and the liquid recirculated from said housing where the membrane is located.

3. Installation according to claim 2, characterized in that each propeller is constituted of a combination of an impeller and a diffuser, and a separator which is disposed between each impeller-diffuser set for separating said sets one from the other, the capacity of the impellers and the diffusers of the first and second series of propellers being such that the volume of liquid delivered by the second series of propellers is greater than the liquid delivered by the first series of propellers.

4. Installation according to claim 3, characterized in that the guides are constituted of alignment bushings.

5. Installation according to claim 4, characterized in that said alignment bushings comprise a pair of rims each comprising a central hub comprising an opening allowing for the passage of a shaft, and ridges in the shape of webs connecting the hub to the rim, an opening having a semicircular shape defined on each of the rims, the two rims being positioned side-by-side, the two openings of semicircular shape facing each other to form a circular opening allowing to convey the recirculated liquid introduced in said pump by said secondary entry towards the second series of pumping stages where the second series of propellers is located.

6. Installation according to claim 1, characterized in that the volume of liquid delivered by the second series of stages is approximately 2 to 8 times greater than the volume of liquid delivered by the first series of pumping stages.

7. Installation according to claim 6, characterized in that the volume of liquid delivered by the second series of stages is approximately 5 to 8 times greater than the volume of liquid delivered by the first series of pumping stages.

* * * * *